(Model.) 8 Sheets—Sheet 1.
W. N. WHITELEY & W. BAYLEY.
HARVESTER AND BINDER.

No. 375,971. Patented Jan. 3, 1888.

ATTEST:
J. C. Turner
E. C. Ford.

INVENTORS
Wm N. Whiteley
Wm Bayley by their atty
R. D. O. Smith (Model.)

W. N. WHITELEY & W. BAYLEY.
HARVESTER AND BINDER.

No. 375,971. Patented Jan. 3, 1888.

ATTEST:
J. C. Turner
E. C. Ford.

INVENTOR:
W. N. Whiteley
W. Bayley (Model.)   8 Sheets—Sheet 3.

W. N. WHITELEY & W. BAYLEY.
HARVESTER AND BINDER.

No. 375,971.   Patented Jan. 3, 1888.

ATTEST:
J. C. Turner
M. V. Smith

INVENTOR:
Wm N. Whiteley
W. Bayley, by their attorney
R. D. O. Smith (Model.)  
8 Sheets—Sheet 4.

W. N. WHITELEY & W. BAYLEY.
HARVESTER AND BINDER.

No. 375,971.  
Patented Jan. 3, 1888.

ATTEST:  
E. C. Ford  
J. C. Turner

INVENTOR:  
W. N. Whiteley  
W. Bayley by their atty  
R. A. O. Smith

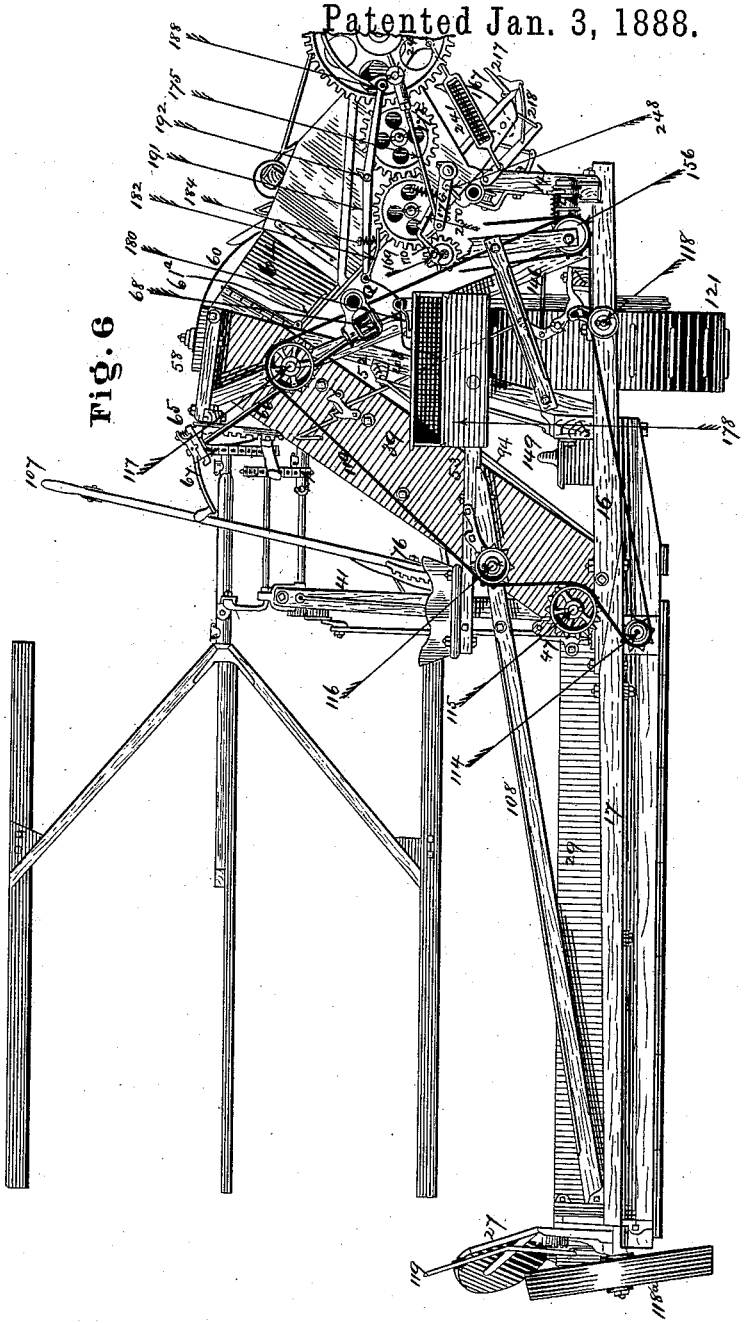

(Model.) 8 Sheets—Sheet 6.
W. N. WHITELEY & W. BAYLEY.
HARVESTER AND BINDER.
No. 375,971. Patented Jan. 3, 1888.
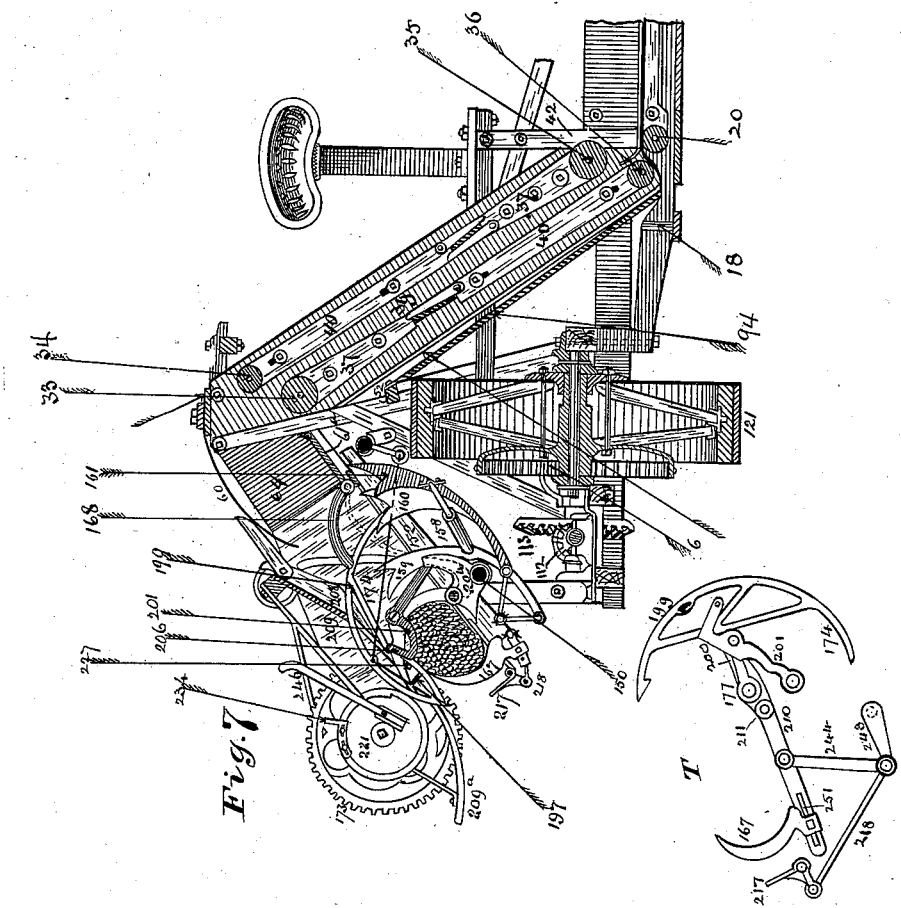
ATTEST:
J. C. Turner
E. C. Ford.
INVENTOR:

(Model.) 8 Sheets—Sheet 7.
W. N. WHITELEY & W. BAYLEY.
HARVESTER AND BINDER.
No. 375,971. Patented Jan. 3, 1888.
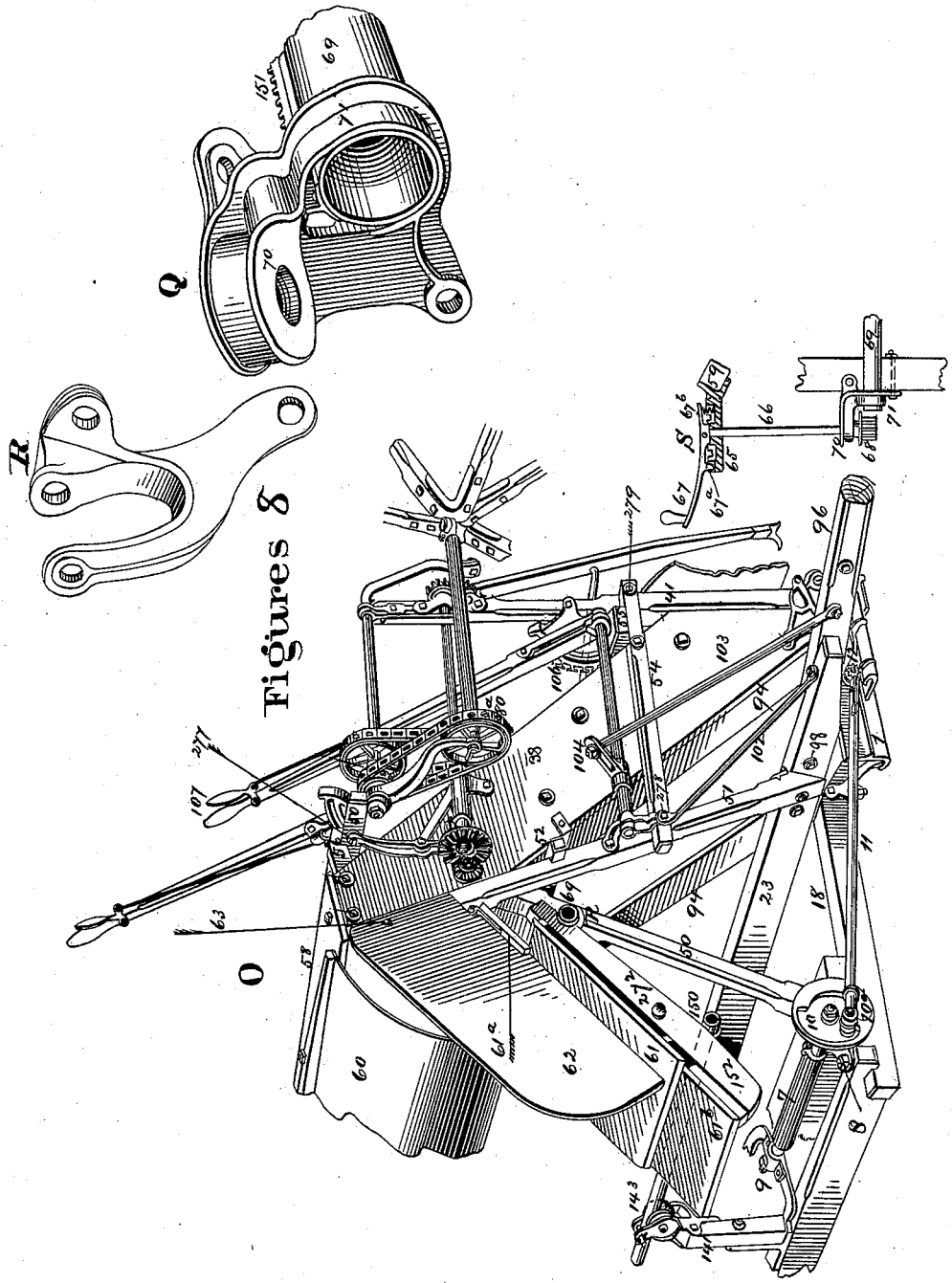
ATTEST:
J. C. Turner
E. C. Ford.
INVENTOR:
W. N. Whiteley
Wm. Bayley
R. D. Smith

UNITED STATES PATENT OFFICE.

WILLIAM N. WHITELEY AND WILLIAM BAYLEY, OF SPRINGFIELD, OHIO, ASSIGNORS TO WHITELEY, FASSLER & KELLY, OF SAME PLACE.

HARVESTER AND BINDER.

SPECIFICATION forming part of Letters Patent No. 375,971, dated January 3, 1888.

Application filed January 30, 1882. Serial No. 51,562. (Model.) Patented in Canada March 24, 1882, No. 14,483.

*To all whom it may concern:*

Be it known that we, WILLIAM N. WHITELEY and WILLIAM BAYLEY, of Springfield, county of Clark, State of Ohio, have invented a new and useful Improvement in Harvesters and Binders, of which the following is a specification, the same having been patented in Canada, March 24, 1882, No. 14,483.

In the accompanying drawings, Figure 1 is a perspective view of a machine with our improvements attached thereto.

Fig. 2 is a perspective view of a detached harvester with our improvements embodied therein.

In Fig. 3, A is a perspective view of the detached binding-machine embodying our improvements. B is a perspective view of the tyer-wheel. C is a side view of the binding-arm and tucker. D is a perspective view of said tucker. E is a side elevation of one of the reciprocating packers. G is an elevation, from the outside of the machine, of the crank-shaft, reciprocating packers, and the oscillatory arms, the binding-arm being shown in dotted lines.

Fig. 6 is a rear elevation of a combined harvester and binder as improved by us.

Fig. 7 is a vertical section in the plane of the main-wheel axle, including a detached elevation of the needle-arm, compressor, &c.

In Fig. 8, O is a perspective view of a portion of the harvester, binding-table, binding-apparatus support, reel driving and operating mechanism, knife-driving mechanism, and the pole-tilting apparatus. Q is a perspective view of the combination journal-box for the support of the rack that shifts the binder across the harvester, and also for the pinion that actuates the same, and R is a perspective view of the inside journal for the support of the binder.

Figure 9:
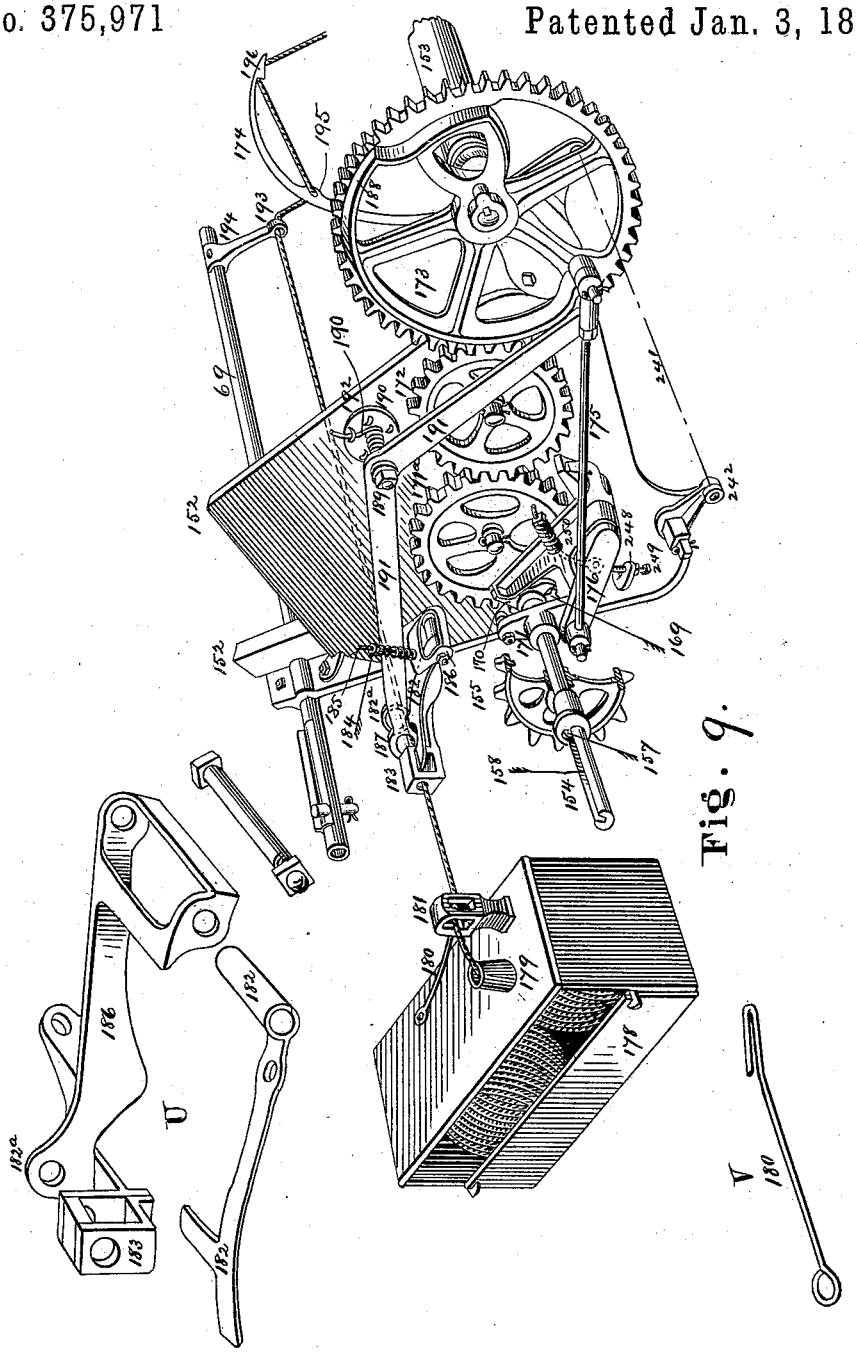

S is an elevation, partly in section, of the device for moving and locking the binder, and Fig. 9 is a perspective view of the tension, take-up, and twine-holding devices. U is a perspective view of the main tension device with its parts detached. V is a detached view of the tension spring belonging to the primary tension device.

Our invention relates to self-binders that compress the grain into sheaves of uniform size, then automatically connect the binding with the harvesting mechanism, encircle the sheaf with a band, unite the ends of the band, and eject the sheaf from the binding-table to the ground without the aid of manual labor; and it consists in the construction and combination of devices for automatically binding grain, as hereinafter particularly described.

To enable others skilled in the art to make and use our invention, we will proceed to describe its construction and operation.

In the accompanying drawings the same numbers represent corresponding parts in each of the figures.

In order to more fully elucidate our improvements, we have illustrated them as attached to a combined harvester and binder.

The cutting apparatus, which is of the utmost importance to a successful harvester, is so constructed and applied that the canvas conveyer, on which the cut grain falls and by which it is conveyed to the elevator, runs very close to the sickle, and thus prevents any accumulation of short grain, grass, or weeds to interfere with the passage of grain to the elevator. This object we attain by the use of an angle-steel finger-beam, 1, which insures great strength with little weight, and decreases the liability to a permanent set of said finger-beam. Attached to the finger-beam 1 are the guard-fingers 2, through and upon which the sickle works. The sickle takes motion from the main wheel 121 by bevel-gear 4, through the agency of pinion 5 and gear-wheel 113 and internal gear-wheel 6, (for which see Figs. 1 and 7 of the drawings.) The shaft of the bevel-gear, with its connected crank-wheel 10, is supported by a pipe-box, 7, that is firmly secured to the main sill of the harvester at 8, and to a combination journal-box at 9. To the wrist-pin $10^a$, in the aforesaid crank-wheel, we attach the pitman 11, to connect the sickle cross-head 12 with the driving-gear 5.

The main frame of the harvester is constructed with longitudinal stringers 16 and 17 on the rear side of the machine, and on the front side with the stringer 18 and angle-steel finger-beam 1. The elevator-rollers 33, 34, 35, and 36 are journaled in the same manner as those of the conveyer, the stationary parts 37 being made fast to the front and rear elevator-sides 38 and 39, and the movable parts 40 sliding upon bolts and thimbles made fast to said sides.

The elevator-frame is constructed by erecting uprights 41 and 42, with the part 41 secured at its lower end to an elevated shoe. The upright 42 is secured to the stringer 16 and weather-board 29 by means of a metal piece, 47. Triangular braces 48 49 are raised from the stringer 16, on the rear side of the machine, and corresponding braces, 50 and 51, are erected on the front of the machine from the stringer 18 and cross-tie 23. These triangular braces 48 to 51, inclusive, are tied together by a transverse cross-tie, 52, and braces 53 and 54, which also join with uprights 41 and 42, that are tied transversely by the seat-board 55, and these combined braces and cross-ties form a frame to which the elevator-sides 38 and 39 are attached. To the upper ends of the sides 38 and 39 we secure battens 56 and 57, to which the top covering, 58, and cross-tie 59 are secured. To the covering 58 we attach a curved piece of flexible sheet metal, 60, that serves to properly deflect the grain from the exit end of the elevator to the binding-table 61, and to the side 38 of the elevator we pivot a butt-board, 62, by means of a bolt and thimble, 63, upon which said butt-board may be tilted vertically, out of the way of the binding-table, when from any cause said binding-table has to be removed. This butt-board serves to prevent the butts of the grain from projecting past the binding-table, and helps to even the ends of the sheaves.

To the rear side of the elevator-frame we hinge a head board, 64, the free end of which moves forward and backward with the binding-machine and serves to deflect the grain properly to the binding-machine, whereby loose grain is prevented from falling to the ground and a better presentation of grain to the binding-machine is obtained. We hinge the part 61ª of the binding-table to the triangular braces 48 and 51, for the more convenient removal of the middle and removable part 61 of said table for the purpose of obtaining a ready access to the binding mechanism located below it.

To the rear side, 39, of the elevator-frame and to the cross-tie 59 we bracket a notched disk, 65, that forms the upper journal for the pinion-shaft 66, and is provided with a number of notches or recesses for the stud 67ª of the spring-lever 67 to fall into and be thereby retained. By raising on the handle of lever 67 until the stud 67ª leaves the notch with which it is engaged the lever may be turned in any direction to revolve the pinion 68, that actuates the upper and toothed retaining-pipe, 69, of the binder, and by releasing said lever the spring 67ᵇ will return it to the first convenient notch in the disk 65, whereby the binder may be rigidly held at any desired point across the elevator.

For detail of lever 67 and the lower journal of pinion-shaft 66, see Fig. 8, view S, of drawings, in which 70 is the lower journal referred to, and 71 the upper and back support for the retaining-pipe 69.

By the use of a piece of strap iron, 93, adjustably hinged to the grain-board 27, and curved at its free end 93ª, to project up into the mouth of the elevator, we are enabled not only to check the heads of the grain for the purpose of keeping it straight, but to bridge over the gap at the intersection of the conveyer and elevator belts and thereby obtain a proper transfer of grain from the conveyer to the elevator without loss of grain. In addition to the curved rod 93 93ª, we attach correspondingly-curved pieces 93ᵇ, one to each side, front, and rear of the conveyer-platform, to assist the curved rod 93 93ª in the transfer of grain. The back of the lower elevator-belt is supported by three strips, 94, two of which are secured to the sides of the elevator and the other and middle one to the cross-ties 52 and 95. The draft-pole 96 is secured to the elevator-frame by means of a king-bolt, 98, passing through and attached to the cross-tie 23. The projecting end of the cross-tie 23 is re-enforced by a brace-rod, 102, which connects it with the braces 51 and 54 of the elevator-frame.

By means of a rod, 103, permanently attached at one end to the pivoted draft pole 96 and at the other adjustably attached to a lever, 104, that is fast to the lever-shaft 105, which is journaled to the braces 51 and 54 at one end and at the other to the toothed quadrantal piece 106, that is fastened to the seat-board 55 and upright 41, we are enabled to tilt the cutting apparatus to suit the varying conditions of the grain through the agency of a lever, 107, fastened to the shaft 105 and engaging with a toothed quadrantal piece, 106, in substantially the same manner as that of the reel-tilting lever. A brace, 108, rigidly connects the grain-wheel end of the conveyer-platform with the elevator-frame. As the machine advances into the grain, the grain to be cut is properly divided from that which is to remain for subsequent operations by a divider and gatherer, 27, with its grain-rods 27ª and 27ᵇ, and by a gatherer and divider, 109, and its grain-rod 109ª. (See Fig. 2.)

We mount the harvester above described upon two traveling wheels, known, respectively, as a "master-wheel" and a "grain-wheel." The grain-wheel 118ª is vertically adjustable by means of a lever, 119, said lever being constructed and operated in substantially the same manner as that which drives the reel. The canvas belts are stretched over driving and driven rollers 33 to 36, inclusive, the driving-rollers 33 and 35 being of greater diameter than the driven, to increase their area of contact with the belt and correspondingly increase the driving effect. The capacity of the lower roller to propel the elevator-belt will also be increased by the pressure of the entering grain at the mouth of the elevator, which will press the belt tight against the driving-roller. We locate the driving-roller 33 of the lower belt at the top of the elevator and the driving-roller of the upper or compression belt at the bottom of the same, and communicate motion to them and to the driving-roller 20 of the conveyer by means of an endless chain, 110, that receives its motion from bevel-pinion 112, that is actuated by the same bevel-wheel, 113, that drives the sickle-pinion. From the sprocket-wheel 111, by means of a chain, 110, motion is communicated to the conveyer-roller 20 through the agency of a sprocket-wheel, 114, at the end of said roller; to the roller 35 by means of a sprocket-wheel, 115; to an idler sprocket-wheel, 116, which is used to give greater bearing-surface to the chain 110 as it passes over sprocket-wheel 115, and to the sprocket-wheel 117, by which the roller 33 is driven. A smooth-surfaced adjustable idler, 118, is used to tighten the endless chain 110 after it has been slipped over the various sprocket-wheels above described.

We provide the harvester-frame with three bearings for the support of the binding-machine—viz., a bifurcated metallic piece, R, secured to the triangular brace 50, a metallic band forming a part of the combination-box Q, attached to the triangular brace 49, and a friction-roller, 143, attached to the upright 141. The binding-machine is supplied with two cylindrical supporting rods or tubes, 69 and 150. The tube 69 is fitted with a rack, 151, that engages with a pinion, 68, by which the binding-machine may be moved across the delivery end of the elevator to insure a central delivery of the cord around the sheaves with varying lengths of grain to be bound. The tube 69 is supported by the combination-box Q at 71 and the bifurcated metallic piece R, bolted to the brace 50. The tube or rod 150 is supported by the grooved friction-roller 143, that is fastened to the upright 141. The aforesaid tubes or rods are secured to a frame, 152 and 153, upon which the binding mechanism and binding-table are mounted. The binding mechanism is driven by a shaft, 154, that derives its motion from the sprocket-wheel 155, that is connected by an endless chain with the sprocket-wheel 156, moving with the bevel-pinion 112 of the harvester mechanism. The sprocket-wheel 155 is fitted with a spline, 157, that moves in a groove, 158, formed in the shaft 154, for the purpose of permitting the sprocket-wheel 155 to move longitudinally on the shaft 154, so that it may keep in line with the stationary wheel 156, that is upon the harvester, while the binding mechanism is shifted to suit the varying lengths of grain. To the shaft 154 we couple a malleable-iron crank-shaft, 158$^a$, that is provided with three cranks, to which are journaled, at or near the centers, three packers, 159, 160, and 161. These packers are controlled in their movements and kept in the desired course of travel by pivoted levers 162, 163, and 164. The crank-shaft 158$^a$ is journaled to the frame 152 by journal-boxes 165 and 166, which are located below that part of the binding-table numbered 61, and the aforesaid packers work through slots in said table, made and located suitably for an unobstructed passage of the packers. The grain as it is delivered upon the binding-table by the elevator comes in range of the packers, two of which, 159 and 161, work together and move the grain forward against combined retaining, tripping, and compressing arms 167, while the packer numbered 160 is retreating beneath the binding-table after performing a similar duty, and the twin packers 159 and 161 retreat while the packer 160 is advancing with more grain, and so they continue forcing the grain into a compact form against the aforesaid tripping and compressing arms 167 until a sufficient quantity has been delivered to form a sheaf of the required size, at which time the arms 167 will retreat a distance sufficient to set the binding mechanism in motion.

Figure 3:
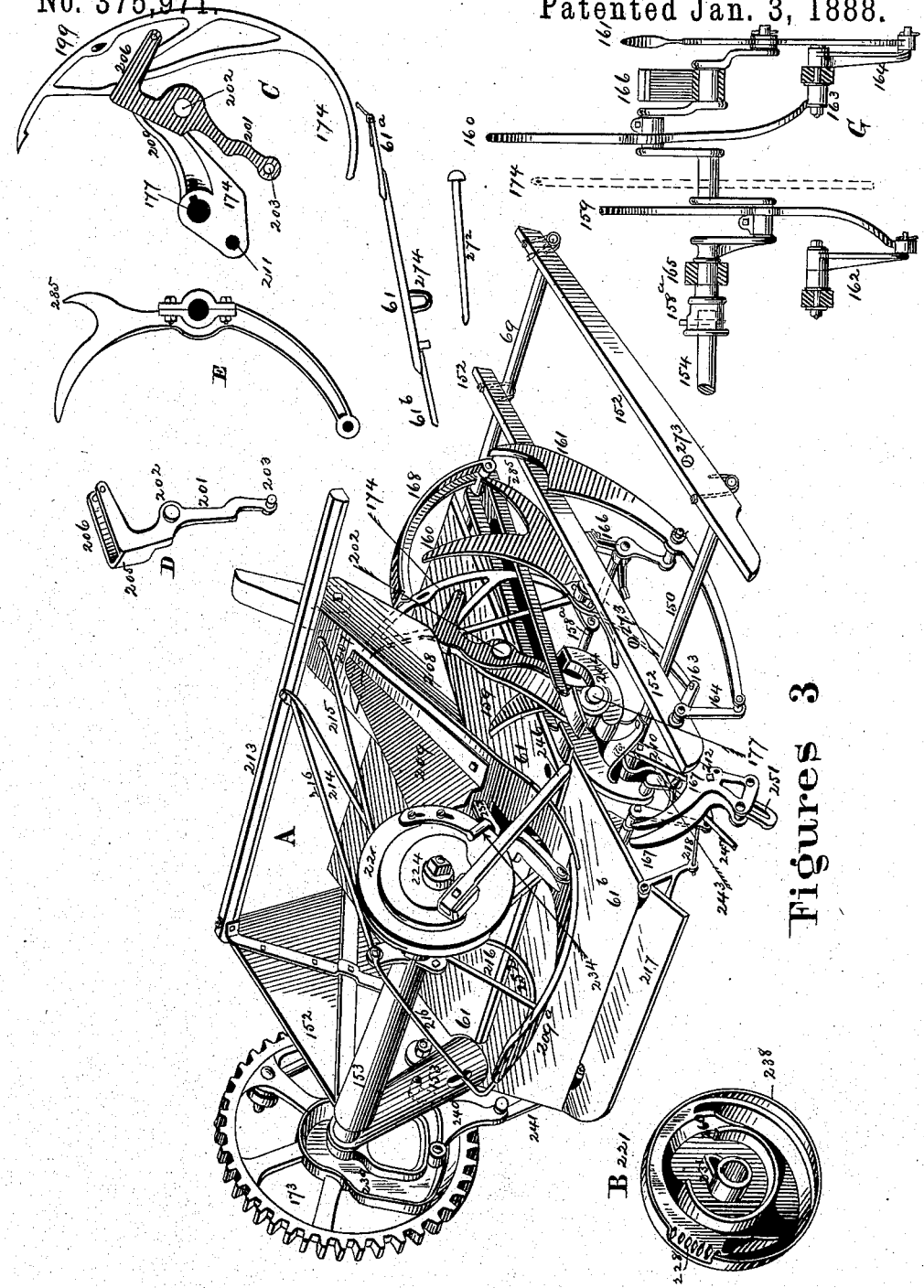

It will be observed by reference to Fig. 3 that the packer 161 is located as near to the butt-board 62 as is practical when the binding mechanism is adjusted for short grain. This packer performs a very important function, as it is continually bringing down the butts of the grain, while the other packers become inoperative by reason of a division taking place in the grain through the agency of a guard formed on the back of the binding-arm, aided by a hinged divider, 168, to be referred to hereinafter. The shaft 154 that drives these packers also drives the whole of the binding mechanism through the agency of a pinion, 169, loosely fitted upon said shaft, but constructed and arranged in a suitable manner to be coupled thereto by the action of the tripping-arms 167. On the pinion 169 a lever, 170, is pivoted, as shown by Figs. 6 and 9, controlled by a spiral spring, that when liberated by the action of the arms 167 and intermediate connections, to be explained hereinafter, forces the short end of said lever outward into the path of a fixed arm, 171, upon the shaft 164, and the pinion 169 being thus connected to the shaft 154 will communicate motion, through the agency of intermediate gear-wheels, 171$^a$ and 172, to the main gear-wheel 173, that transmits motion to the binding-arm 174 by means of a pitman, 175, a vibrating lever, 176, and a shaft, 177, properly journaled to the binder-frame 152 and 153. The binding-arm is supplied with cord from a box, 178, and said cord on its way from the box to the binding-arm passes through an eye, 179, that raises it to about a level with a spring-tension that is used to remove the snarls from the cord. This tension is provided with a leaf or other suitable spring, 180, between which and the top of the box 181 the cord passes on its way to the main tension device, which consists of a pivoted arm, 182, bifurcated at its free end, so that one part may bind the cord against the top of the box 183, while the other rests under the lever 191. The stationary piece is provided with an eye, 182ª, through which the cord is passed. The arm 182 is provided with a compression-spring, 184, formed by pivoting a long bolt, 185, to it, and loosely passing said bolt through the stationary piece 186, to which the arm 182 is pivoted, with the spring 184 resting on the piece 186, and forced against it by a nut moving on the bolt 185, by which means the tension may be made to suit varying circumstances and demands.

To assist the tension devices just described at the time the binding-arm is encircling a sheaf with cord, we employ an obtuse-angled lever, 191, pivoted at or near its center. In one end of this lever we form an eye, 187, through which the cord passes on its way to the eye 182ª, and at the other end we have a friction-roller acted upon by a cam-track, 188, formed upon the gear-wheel 173. Around the pivot-pin 189 we coil a spring, 190, one end of which is fast to said obtuse-angled lever, while the other is retained by any one of a series of projecting stops formed around a stationary disk, 192. When the binding-arm commences to ascend, the cam 188 gradually raises the eye 187 of the lever 191, and thereby takes up the cord in loop form between the box 183 and the eye 182ª, thereby tightening the cord between that point and the binding-arm. Whenever the friction-roller on the arm 191 leaves the cam-track 188, the spring 190 will return the eye 187 to the space between the bifurcated ends of the lever 182 and depress said lever 182, and thereby relieve the tension.

Preparatory to starting the binding mechanism one or more balls of cord are put into the box 178, one end of the cord is passed through the eye 179, preliminary tension 181, tension 183, the eye 187 on lever 191, the eye 182ª on the arm 182, through an eye, 193, of arm 194, that is secured to the tube 69 through a transverse eye, 195, in the binding-arm 174, and from thence through a longitudinal eye, 196, in the point of the binding-arm to the gripper 197, by which the working end of the cord is continuously held. As the binding mechanism is started by the action of the packers upon the grain accumulated in front of the arms 167, the binding-arm 174 ascends and completely encircles the sheaf with a band, and both ends of said band are held in separate but neighboring notches in the gripper 197. The binding-arm in ascending from beneath the binding-table strikes a hinged grain-divider, 168, that lies close to said binding-table, and elevates its free end until the concentric portion 199 of the binding-arm engages with it and retains it at a suitable elevation to make a complete and wide separation of the sheaf to be bound from the incoming grain. At the time the binding-arm 174 moves toward the arms 167 its arm 200 assists in the compression of the grain that is located between it and the arms 167.

To further assist in the compression of the sheaf and for the purpose of making a space between the top of the binding-arm and the sheaf, for the cord to lie in in an unobstructed manner, we employ a tucker, 201, pivoted to the binding-arm at 202 and actuated by a stud, 203, engaging with a stationary and grooved cam, 204, which moves the free end 205 of the tucker down upon the sheaf during the finishing upward stroke of the binding-arm. It will be observed that the end 205 of said tucker is widened. This is done to furnish an increased surface to engage with the binding-cord lying in its path, so that it may deliver said cord into a suitable position to be properly acted upon by the knotting device, which will be hereinafter described. The ears 206, running back from the widened face of the tucker and located one on each side of the binding arm, are used to bridge the space which would appear between the contiguous edges of the binding arm and tucker when said tucker is out from the binding-arm in the act of assisting in the compression of the grain. We regard the addition of these ears to the tucker as very important, as they prevent grain and other foreign matter from entrance between the tucker and binding-arm while the tucker is out from the binding-arm, and thereby insure an unobstructed return of the tucker to its position of rest against the edge of the binding-arm.

Attached to the breast-plate 207, depending from the lower surface thereof, are two ribs, 208, between which the binding-arm enters after leaving the hinged divider 168, and by which, when aided by said divider, a perfect division of grain is effected. The breast-plate 207 is also provided with a rib, 209, projecting from its top surface for additional protection to the binding-arm, the breast-plate 207 being suitably slotted for the passage through it of the binding-arm and to form a guide for the cord on its way to the knotting device.

As it is very important that the sheaf should be thoroughly compressed, the combined retaining, tripping, and compressing fingers 167, through the agency of a lever, 210, suspended from an eccentric pivot, 211, on the heel of the binding-arm, are moved upward to meet the binding-arm while said arm is finishing its stroke toward the knotting device, and the breast-plate 207 and its ribs 208 and 209 assist the compressing device by retaining the grain from escape in an upward direction. This breast-plate is secured to the frame 152 and 153 by a cross-tie, 213, and braces 214, 215, and 216, by which means it is completely suspended from above, and does not in any way interfere with the proper movements of the incoming and outgoing grain.

The grain-retaining board or end-gates 217, hinged to the parts 61ᵇ of the binding-table, serve to straighten the grain as it is packed against the arms 167, and they are connected to the crank 243, which controls the lever 210, by a rod, 218, and consequently move with the arms 167, so that when the arms 167 are elevated to receive the grain so are these grain-retainers 217, and the arms 167 are lowered for the free discharge of a sheaf so are these grain-retainers.

Figure 5:
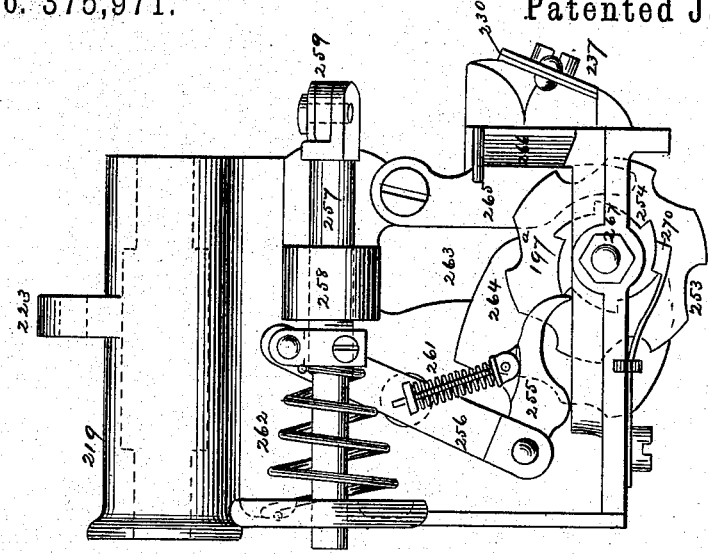
Fig. 5 is an elevation of the back of the knotting device.
Figure 4:
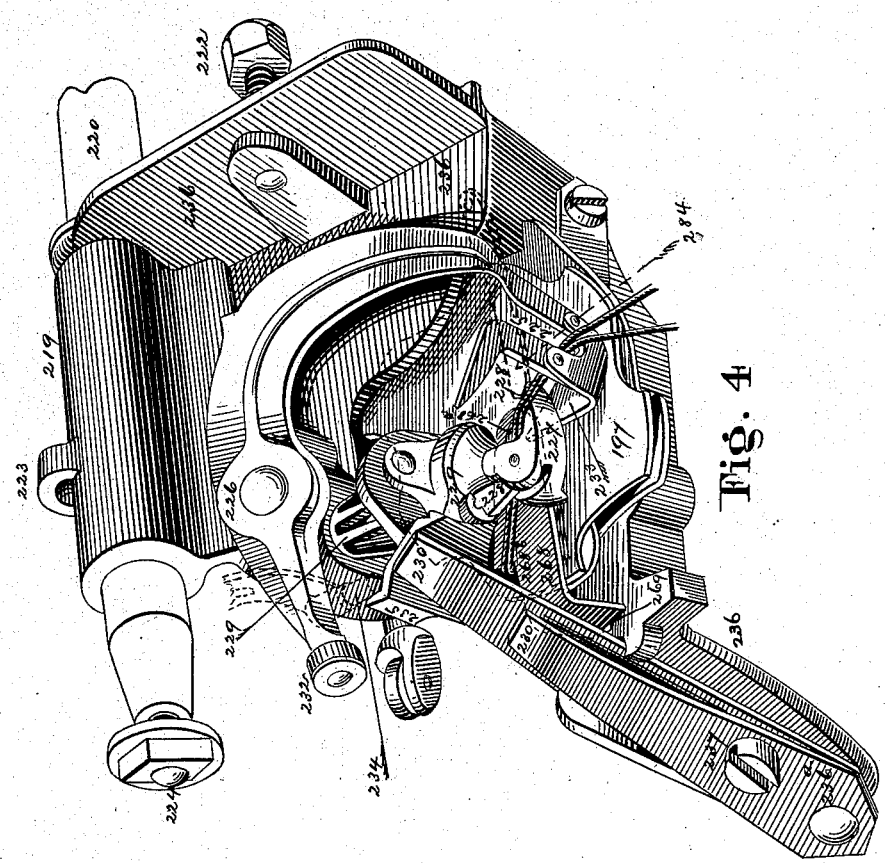
Fig. 4 is a perspective view of a knotting device with our improvements added thereto.

The sleeve 219 of the frame of the knotting device, (represented by Figs. 4 and 5 of the drawings,) fits loosely over the shaft 220, that operates the tyer-wheel 221, and is secured to a flange upon the frame 153 by a set-screw, 222. The lug 223, cast upon the sleeve 219, supports one end of one of the brace-rods 216, that suspends the curved and exit end 209ª of the breast-plate 207. The gear-wheel 173 is fast to one end of the shaft 220, and the tyer-wheel 221 is made fast to the other end by means of a spline that is fixed to said tyer-wheel and loosely fitted to a groove in said shaft, and the end 224 of said shaft is threaded and provided with a nut that holds the spline and tyer-wheel to their proper places and at the same time furnishes a ready means for disconnecting the knotting device from the binding-machine when said binding-machine is not in use. The tyer-wheel 221 is located at the extreme end of the shaft 220 in the manner previously described, and the knotting device is located immediately at its rear and receives its motion from fractions of gear and cams formed upon said tyer-wheel in a manner now to be described.

As before specified, the binding-arm is "threaded" and the end of the binding-cord secured in the gripper 197 previous to putting the binding-machinery in motion, and the point of the binding-arm being located below the table 61 while the gripper 197 is elevated above the breast-plate 207, the cord will lie fairly across the path of the grain brought in to be bound. Consequently, as the grain is forced forward by the packers, the binding-cord retreats before it, and occupies a place between the arms 167 until sufficient grain has accumulated to form a sheaf, and the binding machinery is put in motion in the manner previously described. Then the binding-arm encompasses the sheaf and delivers the other end of the band-cord to the gripper 197. The binding-arm, in delivering the ends of the band-cord to the gripper, passes them through a slot in the breast-plate 207, and also through a gap, 225, in the pivoted combined stripper and cutter 226. This insures the proper delivery of the cord across the knotter 227.

As before specified, the tyer-wheel 221 is provided with teeth. These teeth 228, seven in number, actuate a pinion, 229, having eight teeth, and to this pinion the knotter 227 is firmly secured, so that when the teeth on the tyer-wheel engage with the knotter-pinion the latter is rotated just one revolution to the left in Fig. 4, winding the cord which lies across it around its axis, and thus the bight of the knot is formed. This knotter 227 is provided with a pivoted tongue, 228, that opens by the action of a cam, 229, around which the friction-roller forming a part of the tongue 228 rides. As it approaches the ends of the band-cord held by the gripper 197 the hook 227 passes below the ends of the cord, while the tongue 228 passes above them. Then the roller on the tongue 228 comes in contact with a spring cam-track, 230, and knotter firmly grips the ends of the band, and the hook finishing its revolution completes the knot. The knot being thus completed, a cam, 231, formed on the tyer-wheel 221, engages the end 232 of the pivoted cutter and stripper 226, and forces the gap 225 and cutter 233 to the right in Fig. 4, by which action the loop of the knot is forced from the hook 227 over the ends of the cord and the band cut loose from the gripper. After this has been accomplished an adjustable stud, 234, fastened to the tyer-wheel 221, engages with a cam, 235, upon the spring cam-track 230, and thus releases the ends of the band previously held by the knotter, and the sheaf is ready to be ejected from the machine, and the wheel 173 continuing in its course returns the binding-arm to its place of rest under the table 61, and by the combined action of the cam-track 239, bell-crank 240, limitedly-yielding connecting-rod 241, crank 242, with its shaft extending back to and connected with crank 243, arm 244, that the lever 210 is fulcrumed to, and a rod, 218, that connects with the hinged tail-board 217, (see diagram T, Fig. 7,) forces the said hinged tables 217 and the compress-fingers 167 open in the manner illustrated by Fig. 3 of the drawings, and the ejecting-levers 246 246ª, revolving with the tyer-wheel 221, remove the sheaf from the binding-table, after which the tables 217 and arms 167 return to the positions shown by Figs. 6 and 7 of the drawings, and the point of the binding-arm comes to rest below the table 61. As the compress-fingers return to their positions of rest in the manner above specified, a lever, 247, connected to said arms by a slot in which it slides, and extending back under the binding-table to a shaft carrying at its other end lever 248, provided with a set-screw, 249, holding up a spring lever, 250, which permits the lever 170 to engage with pinion 169, will now retreat from below the lever 250, which will return to its place of rest and arrest the spring-latch attached to the pinion 169 in a suitable manner to remove it from the path of the continuously-revolving arm 171, and the binding mechanism will then be at rest and will so remain during the formation of another sheaf.

The slot 251 in the lever 210 is for the purpose of allowing the compress-fingers 167 to be moved in or out to make larger or smaller sheaves. The same result can be obtained by having more or less compression on the spiral spring used to return the lever 250.

In ejecting the sheaf it is of the utmost importance to have the ejecting-arms properly protected against a probability of entanglement with grain while in the act of ejecting it. For this purpose we equip the breast-plate 207 with a curved extension, 209ª, near to one side of which the exterior ejecting-arm, 246, works, and between the other side of which and a curved rod, 252, the interior ejecting-arm, 246ª, works.

The spring cam-track 230 and the cam 235 are constructed with two pieces of spring-steel, secured to the knotter-frame 236 at 236ª either by rivets or screw-bolts, the track 230 being secured to the lower and longer piece, while the upper and shorter spring serves to increase or decrease the pressure of the cam-track 230 upon the pivoted tongue 228. This can be accomplished by tightening or loosening the set-screw 237. The knotter-pinion returns to the same place of rest at all times, and thus the knotting-hook 227 is always in proper position to receive the cord laid thereon by the binding-arm, in which position it is retained until the teeth 228 again engage with it. To hold the knotter to this position, there is a stop-projection formed upon its axis that rides upon a rim, 238, upon the tyer-wheel 221. This rim is continuous around the periphery of the tyer-wheel, except where the teeth 228 occur, whereby the knotter-pinion is thrown out of gear and held in a state of rest during the passage by it of said rim 238 and thrown properly into mesh with teeth 228 by aid of the gap formed in said rim for the formation of said teeth.

The gripper 197 of the knotting device is constructed with two plates of equal diameter, separated a suitable distance apart by a washer of less diameter, to which they are riveted. Around the periphery of said plates there are a series of notches, 253. Attached to the rear plate, 197ª, is a ratchet-wheel, 254, actuated by a pallet, 255, that is driven by a pivoted lever, 256, actuated by a push-rod, 257, that has its bearing in the projection 258 of the knotter-frame. Upon the end of the push-rod 257 there is a friction-roller, 259, that engages with a cam-track, 260, formed in the tyer-wheel 221. It is through the agency of this cam-track and roller that motion is transmitted to the pallet 255. To keep said pallet against the ratchet-wheel, into which it works, a spring, 261, is employed, and to return the pallet after making its forward stroke a spring, 262, is used. As the cord is brought through the gap 263 of the knotter-frame 236 by the binding-arm, a plate, 264, located between the notched plates 197 and 197ª, guides the cord to a notch contiguous to the pivoted plate 265, that fits between the aforesaid notched plates and is adjustable against the washer, separating said plates by means of a leaf-spring, 266, made to press against its outside edge with more or less force, so that it may have more or less grip upon the cord that will be brought between it and said washer at the next stroke of the pallet 255, which stroke will take place before the binding-arm returns. This gripper revolves loosely upon a bolt, 267, made fast to the cast frame 236, and by reason of this and the location of the knotter 227 it becomes exceedingly important to have some means of preventing said knotter from turning the gripper forward away from the pallet that actuates it, and thereby leave no notch for the reception of the next succeeding cord. To obviate this difficulty we employ a plate, 268, having one end, 268ª, riveted to the bolt 267, and the other end bent at right angles and provided with a tenon fitting into a hole, 269, in the frame 236. This plate 268 is further provided with a shoulder, 268ᵇ, over which the ends of the cord pass on their way to the knotter, with the edge of the plate in which said shoulder is formed located above the ends of the cord held by the gripper in such a manner that any pulling of the cord will hold the teeth of the ratchet-wheel 254 closely against the spring-pawl 270, and the stroke of the gripper will always be the same, and the notches 253 will always be in the desired position for the reception of the cord.

Figure 1:
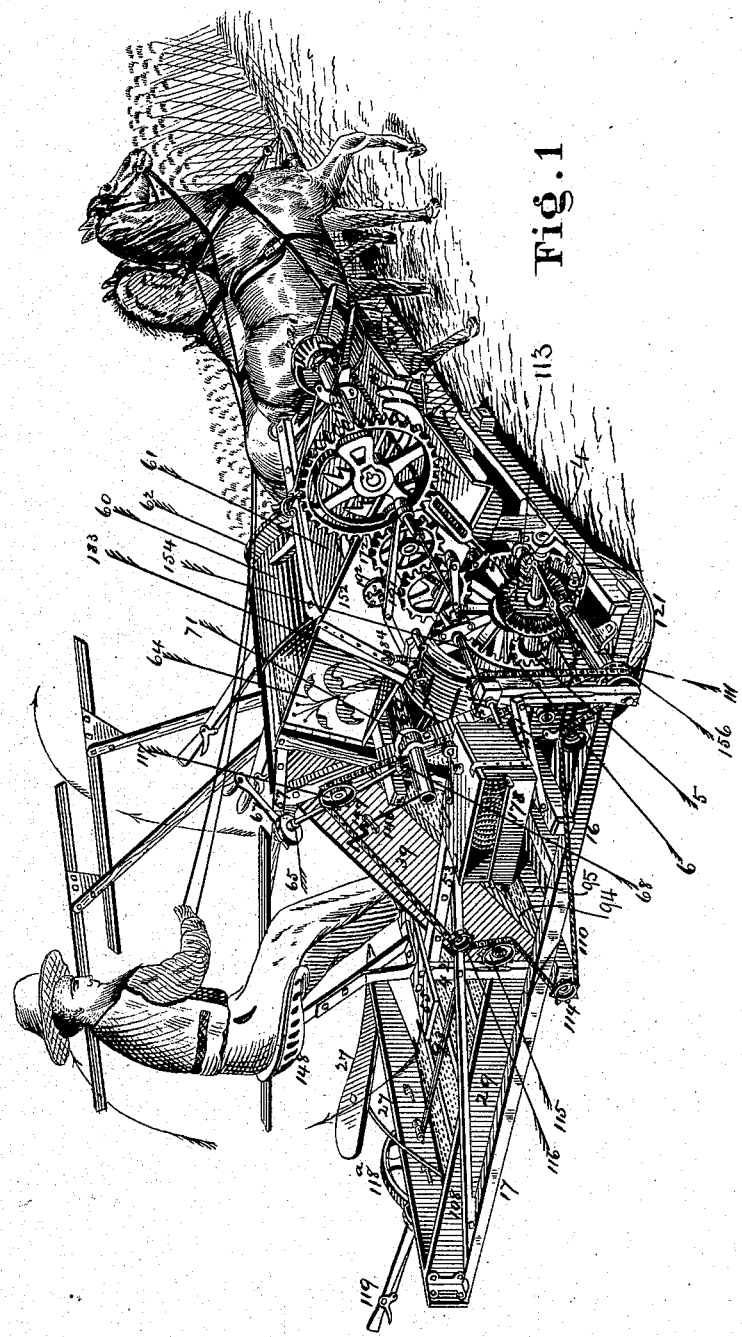
Figure 2:
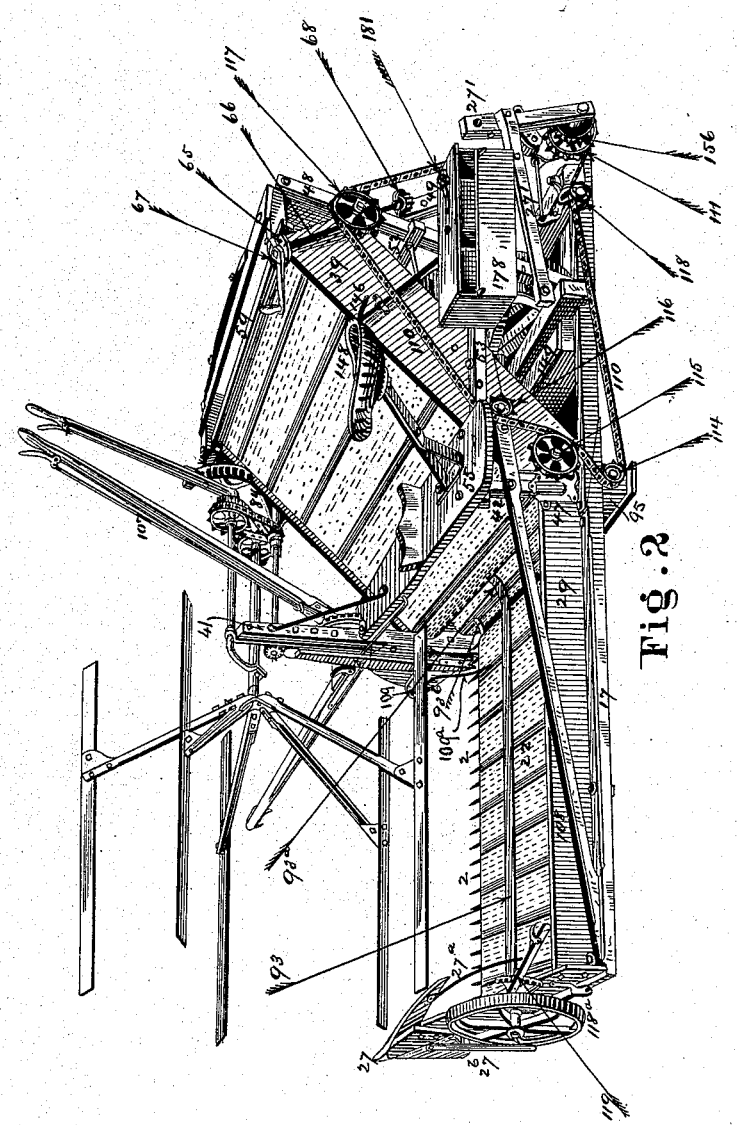

As the driving-shaft 154 of the binding machine projects considerably past the frame 152, we furnish it an additional support, 271, from the harvester-frame, for which see Figs. 1 and 2 of the drawings.

It is very important that the working parts of the machine be readily accessible, and for this reason we construct the binding-table in three parts, 61, 61ª, and 61ᵇ, the part 61 being easily removed by tilting the butt-board 62 on its pivot-pin 63, tilting the part 61ª on its hinges and withdrawing a pin, 272, from holes 273, made in the framing of the frame 152, and from coincident loops 274 on the bottom of the part 61 of said table.

It is obvious that the elevator-rollers may be made of even diameters without departing from the spirit of the invention. The guide 284 (in dotted lines, Fig. 4,) may be used for a more perfect delivery of the cord to the knotter, and for preventing said cord from passing entirely below said knotter. The divider 168, in addition to making a wider division of grain, permits of the points 285 of the packers being lengthened to reach and bring down entangled grain which would otherwise be out of reach.

Having thus described a combined harvesting and binding machine with our improvements attached thereto, what we claim as new, and desire to secure by Letters Patent, is—

1. The combined journal and slide box Q, cast in one piece, provided with the ring-bearing 71, to sustain one end of the tube 69 of the binder-frame and permit it to slide freely, and the bearing 70, for the shaft 66 of the pinion 68.

2. A butt-board, 62, pivoted on the elevator-frame at 63, combined with a removable part, 61, of the binder-table, for the purpose of confining the grain and giving ready access to the binding mechanism by providing for the quick removal of the part 61.

3. A hinged plate or board, 64, secured to the elevator-frame and having its free end lapping over the rear side of the binding-table in such manner as to move with said table and bridge the space made by moving the binding-table over front when working in short grain.

4. The binder-table constructed with the part 61, hinged at the top to the frame, and provided near its lower end with a loop, in combination with the pin 272, adapted to pass through holes in the frame and through the loop, whereby the portion of the table can be removed to give access to the mechanism beneath.

5. In combination with a binding-arm, a tucker, 201, provided with ears 206, as and for the purpose specified.

6. A tension device consisting of the pivoted press-bar 182, a box, 183, provided with an eye, 182$^a$, a pin, 185, and a spring, 184, in combination with a pivoted take-up lever, 191, provided with a spring, 192, and a cam, 188, on the wheel 173, as and for the purpose specified.

7. A principal tension device consisting of the arm 186, box 183, lever 191, and a spring, 190, combined with a preliminary tension device consisting of the parts 179, 180, and 181, as and for the purpose specified.

8. In combination, a knotter, the cam for closing its jaw, and the knotter-operating wheel 221, provided with an adjustable projection, 234, for the purpose of opening the jaw 228 of the knotter 227 always at the desired time after the parts have become worn and adjustment becomes necessary.

9. In combination with a revolving gripper, 197, a stationary strap, 268, as and for the purpose specified.

10. In combination with a revolving gripper, a strap, 268, provided with a notch, 268$^a$, for the purpose of holding the cord more firmly for the cutter 233 to act on.

In testimony whereof we have hereunto set our hands this 11th day of January, 1882.

WILLIAM N. WHITELEY.
WILLIAM BAYLEY.

Witnesses:
HENRY MILLWARD,
E. O. BOWMAN.